United States Patent [19]

Niernberger

[11] Patent Number: 4,848,825
[45] Date of Patent: Jul. 18, 1989

[54] AUTOMOBILE WINDSHIELD COVER

[76] Inventor: Clyde Niernberger, 145 N. Armour Dr., Wichita, Kans. 67206

[21] Appl. No.: 191,909

[22] Filed: May 9, 1988

[51] Int. Cl.⁴ .............................................. B60J 1/20
[52] U.S. Cl. .................................. 296/95.1; 160/370.2
[58] Field of Search ................... 296/95.10, 97.7, 97.1; 160/370.2 X, 84.1

[56] References Cited

U.S. PATENT DOCUMENTS

| | | | |
|---|---|---|---|
| 3,042,111 | 7/1962 | Wytovich | 296/95.1 |
| 3,046,048 | 7/1962 | Cheney | 296/95.1 |
| 4,406,320 | 9/1983 | Bingham | 160/370.2 |
| 4,635,993 | 1/1987 | Hooper et al. | 296/95.1 |
| 4,671,334 | 6/1987 | Yadegar et al. | 160/37.2 |

Primary Examiner—Robert R. Song
Attorney, Agent, or Firm—John W. Carpenter

[57] ABSTRACT

An improved automobile windshield cover to prevent frost, ice, or snow from freezing on a windshield, which includes a foldable, in accordion style, rectangular piece of material having a top edge and a bottom edge. A pair of trapezoidal shaped elements is secured to the sides of the piece of material. A strap is affixed to at least one of the rectangular elements, and a pair of ear elements is secured to the trapezoidal shaped elements along an ear fold line. A stretchable cord is provided with a cord knot at each of its ends. The cord is adaptable to stretch across the rectangular piece of material and is placed stationary thereto by the knots being lodged behind the front door windows of a vehicle and the windows being rolled all the way up to engage a portion of the cord between the window edges and an inside edge of the front doors of the vehicle.

8 Claims, 2 Drawing Sheets

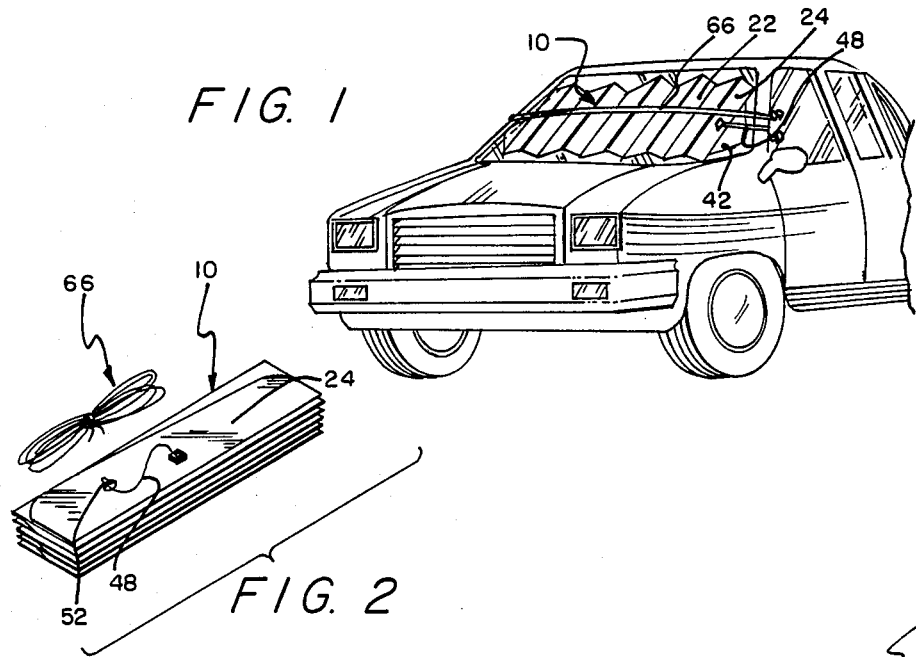
FIG. 1
FIG. 2
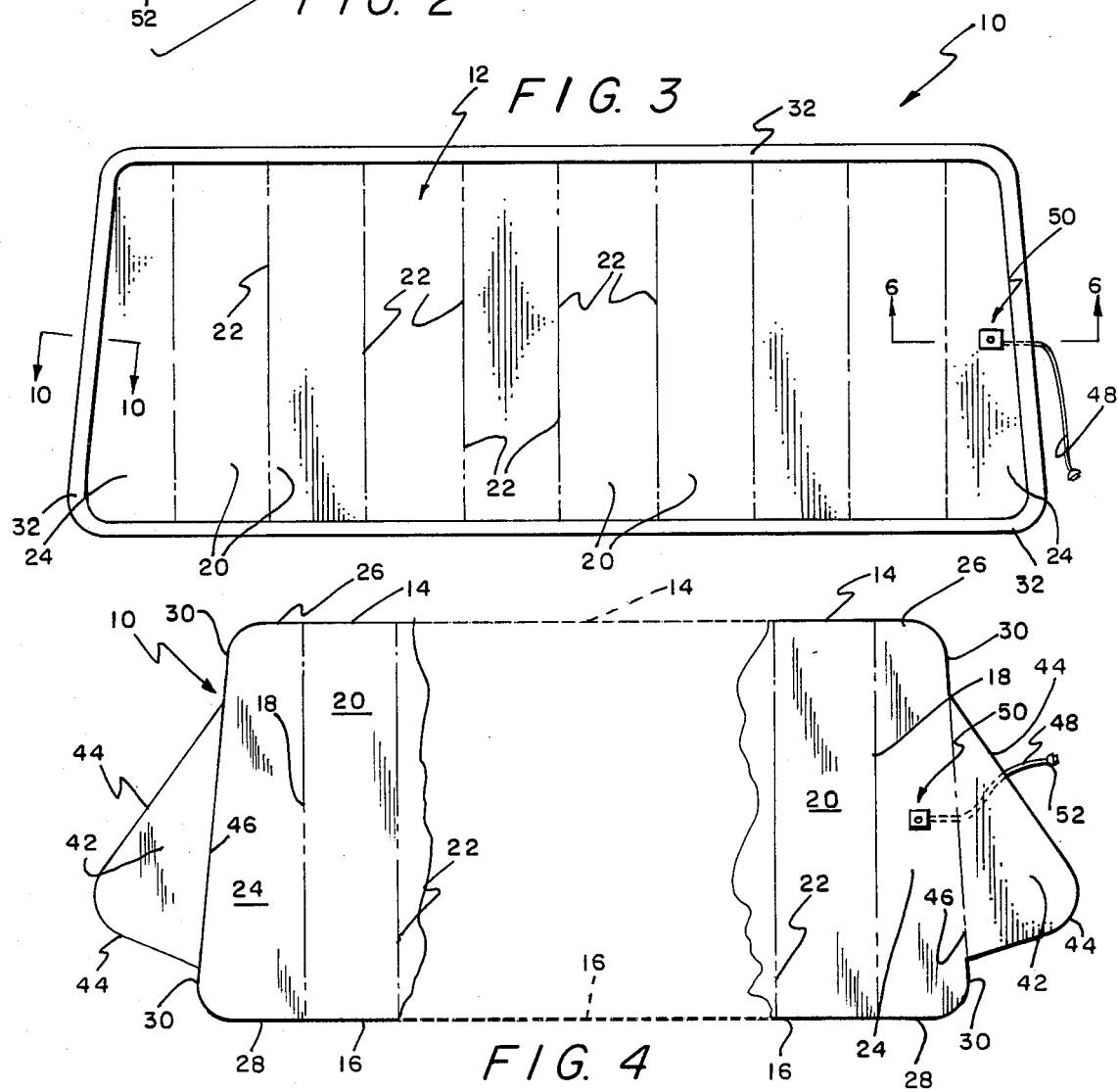
FIG. 3
FIG. 4

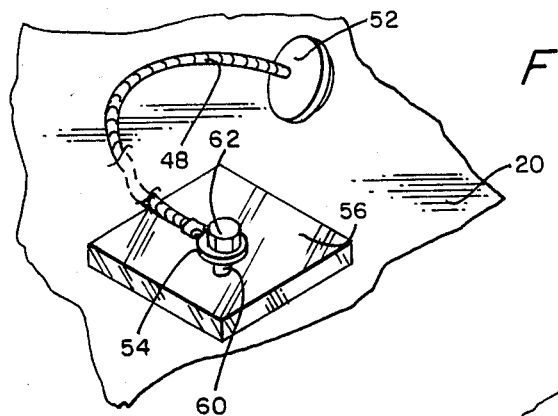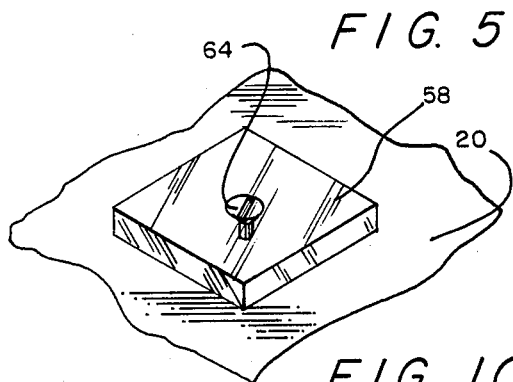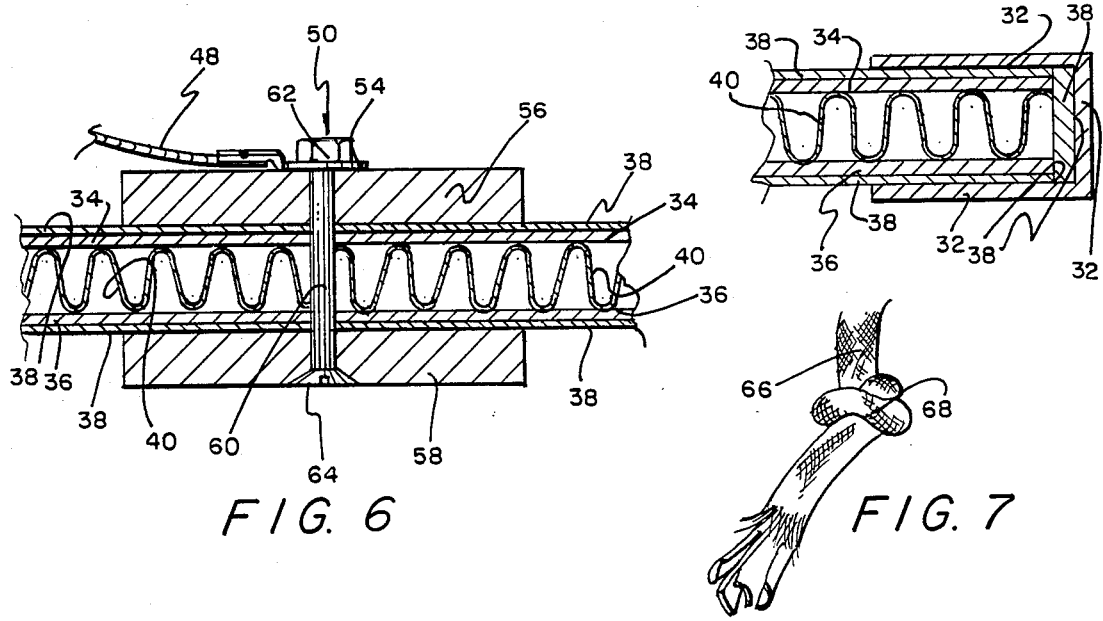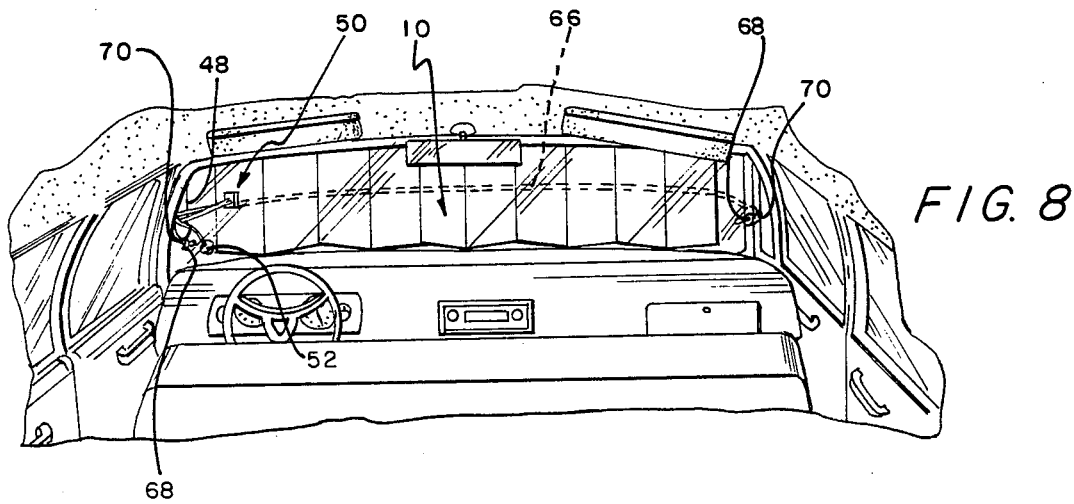

AUTOMOBILE WINDSHIELD COVER

BACKGROUND OF THE INVENTION

1. Field of the Invention

The present invention relates to devices for avoiding the accumulation of frost, ice, or snow on automobile windshields, and more specifically relates to windshield covers adapted to be semi-permanently attachable over the windshield of an automobile.

2. Description of the Prior Art

In the past, as has been indicated in U.S. Pat. No. 4,597,608 to Duffy, various devices have been employed to avoid the accumulation of ice or snow frozen on windshields of automobiles. Specifically, at least two types of attachable covers have been used to serve as a shield for the windshield while the car is in a parked position. One of these prior types of covers included elastic straps having U-shaped hooks attachable to the body of the automobile. Another of these prior art covers is utilized in association with magnetic strips that magnetically clamp the cover to the automobile body.

Both of the above prior art devices suffer from two major deficiencies. Firstly, they are totally acessible to persons who may desire to steal them and, therefore, are highly subject to theft. Secondly, and more importantly, neither of these devices can be installed in rapid fashion to fit tautly on the windshield with little effort or thought to their installation. The present invention overcomes the deficiencies of prior art devices by providing an improved windshield cover that can be quickly and conveniently installed to fit snugly on a windshield and is semi-permanently held in place unless the car doors of the automobile on which it is installed are opened.

The present invention is also an improvement over the automobile windshield cover in U.S. Pat. No. 4,597,688, and the inventions in the following U.S. patents which were discovered in a patentability investigation: U.S. Pat. Nos. 4,202,396 to Levy; 3,874,437 to Black; 4,635,993 to Hooper et al.; 4,708,388 to Zachorezuk; and 4,652,039 to Richards.

SUMMARY OF THE INVENTION

The present invention accomplishes its desired objects by broadly providing a windshield cover comprising in combination a generally rectangular piece of material having a top edge, a bottom edge, and two sides. The rectangular piece is foldable, in accordion style, along a plurality of fold lines, which extend from the top edge to the bottom edge of the rectangular piece of material to define a foldable rectangular piece of material having a plurality of planar rectangular elements jointed to each other along longitudinal edges thereof. The windshield cover also comprises a pair of generally trapezoidal shaped elements having a top edge and a bottom edge and secured to the sides of the rectangular piece of material along an element fold line in an opposed relationship with respect to each other such that the rectangular piece of material is between the two trapezoidal shaped elements. At least one strap means is affixed to at least one of said pair of generally trapezoidal shaped elements; and a strap node means is secured to or integrally formed with an end of the strap means. A stretchable cord means is provided having a cord knot means at each end. The stretchable cord means can be adapted to stretch across the rectangular piece of material to hold the same on a windshield of a vehicle after the cord knot means are placed inside the vehicle and a front door window of the vehicle is rolled up such that the cord means is lodged between an edge of the front door window and an inside edge of a front door of the vehicle holding the front door window.

These, together with the various ancillary objects and features which will become apparent to those skilled in the art as the following description proceeds, are attained by this novel windshield cover, a preferred embodiment being shown with reference to the accompanying drawings, by way of example only, wherein:

BRIEF DESCRIPTION OF THE DRAWINGS

FIG. 1 is a perspective view of the windshield cover of the invention imposed and held in place over the windshield of an automobile;

FIG. 2 is a perspective view of the windshield cover folded into an accordion style position;

FIG. 3 is a bottom plan view of one embodiment of the windshield cover having its borders overlapped with tape or a band;

FIG. 4 is a segmented bottom plan view of another embodiment of the windshield having a pair of ear elements flanged thereout;

FIG. 5 is a perspective view of one of the support plates having a screw or bolt extending therethrough;

FIG. 6 is a vertical sectional view taken in direction of the arrows and along the plane of line 6—6 in FIG. 3;

FIG. 7 is a perspective view of a knot formed on an end of the stretchable cord;

FIG. 8 is a perspective view of the inside of an automobile with the windshield cover placed over the windshield of the automobile;

FIG. 9 is a perspective view of the other support plate with a bolt sleeve passing therethrough and with the eye of an end of a strap affixed around the bolt and wherein the strap has a strap node secured to an end having the eye; and FIG. 10 is a vertical sectional view taken in direction of the arrows and along the plane of line 10—10 in FIG. 3.

DETAILED DESCRIPTION OF THE INVENTION

Referring in detail now to the drawings wherein similar parts of the invention are identified by like reference numerals, there is seen a windshield cover, generally illustrated as 10, which is to be placed over a windshield of a vehicle, such as an automobile, to prevent the accumulation of frost, ice, or the like, on the windshield. The cover 10 has two preferred embodiments, with one preferred embodiment being shown in FIG. 3 and the other preferred embodiment being shown in FIG. 4.

Both of the preferred embodiments for the cover 10 in FIGS. 3 and 4 have a generally rectangular piece of material, generally illustrated as 12, having a top edge 14, a bottom edge 16, and a pair of sides 18—18. As illustrated in FIG. 2, the cover 10 is capable of being folded accordion style between the material 12 defines a plurality of planar rectangular elements 20 jointed to each other along longitudinal foldable edges 22.

A pair of generally trapezoidal shaped elements 24—24 secure to a pair of extreme rectangular elements 20—20 along the sides 18—18 which define fold lines such that the elements 24—24 are in an opposed relationship with respect to each other and the rectangular piece of material is between the two trapezoidal shaped elements 24—24. Each of the elements 24—24 has a top 26, a bottom 28, and a side 30. In the preferred embodiment for the cover 10 in FIG. 3, a tape or band member 32 (preferably the waterproof or water resistant type) is lapped over the top 26, the bottom 28, and the side 30 of each of the elements 24—24, along with being lapped over the top edge 14 and the bottom edge 16 of the rectangular piece of material 12. When the tape or band member 32 is lapped as such, the lapped form is generally U-shaped, as illustrated in FIG. 10, and is adhered or otherwise secured to a bottom surface 34 and a top surface 36 of the trapezoidal elements 24—24. A waterproof or water resistant coating 38 (which will be further explained and defined below) preferably coats or is otherwise disposed on the top surface 36 and the bottom surface 34 and over the spaced area between the surfaces 34 and 36 at the ends thereof, as illustrated in FIG. 10. Disposed between the two surfaces 34 and 36 is a corrugated body 40. As illustrated in FIG. 10, the waterproof coating 38 is preferably disposed over the corrugated body 40 to totally enclose the corrugated body 40 and the space along the ends of the two surfaces 34 and 36. As further illustrated in FIG. 10, the tape or band 32 is lapped over the various surfaces after the waterproof coating 38 has been applied.

In a preferred embodiment of the invention, each of the rectangular elements 20 is manufactured from the same material from which the trapezoidal elements 24—24 are manufactured. Thus, each of the rectangular elements 20 comprise the corrugated body 40 sandwiched by the top surface 36 and the bottom surface 34. The waterproof coating 38 preferably coats and encapsulates the body 40 and the surfaces 34 and 36 of each of the rectangular elements 20; and the tape or band 32 is lapped over the various surfaces of the edges of the elements 20 after the waterproof coating 38 has been applied.

In the preferred embodiment of the invention in FIG. 4, a pair of ears 42—42 is secured to the sides 30—30 of the pair of elements 24—24 such that the ears 42—42 are in an opposed relationship with respect to each other and the rectangular piece of material 12 and the attached trapezoidal shaped elements 24—24 are between the two ears 42—42 (as illustrated in FIG. 4). Each of the ear elements 42 has an ear side edge 44. The point of attachment of the ears 42—42 to the sides 30—30 defines an ear fold line 46. The ears 42—42 are preferably manufactured from the same material from which the trapezoidal elements 24—24 and the rectangular elements 20 are manufactured; thus, each of the ears comprise the corrugated body 40, and the surfaces 34 and 36 which sandwich the corrugated body 40. The waterproof coating 38 also preferably coats and encapsulates the body 40 and the surfaces 34 and 36 of each of the ears 42; and the tape or band 32 is preferably lapped over the various surfaces of the ear side edge 44 of the ears 42—42 after the waterproof coating 38 has been applied.

A strap (or anchor cord) 48, serving as a "rip-off" spoiler, is connected at a connecting location, generally illustrated as 50, to at least one of the two trapezoidal shaped elements 24. The strap 48 has a node 50 at one end an eye 52 at another end. The connecting location 50 comprises a top plate 56 and a bottom plate 58. A bolt hollow sleeve 60 with a bolt head 62 slidably passes through the top plate 56, the waterproof coating 38 (on the surface 36), top surface 36, corrugated body 40, bottom surface 36, waterproof coating 38 (on the surface 36), and into and through the bottom plate 58 such that a cylindrical opening (not shown) of the hollow sleeve 60 is exposed on the surface of the bottom plate 58. A threaded screw/bolt 64 threadably engages the bolt hollow sleeve 60 to couple the plates 56 and 58 together and sandwich the trapezoidal shaped element 54. The eye 52 is secured around the bolt hollow sleeve 60 and is flushed against the exposed outer surface of the top plate 56 by the bolt head 62 as best illustrated in FIG. 6.

The windshield cover 10 of this invention also comprises a stretchable cord 66 having a knot 68 at each end. The stretchable cord 66 is adaptable to stretch across the rectangular piece of material 12, the two trapezoidal elements 24—24 (and the optional ears 42—42) to hold the cover 10 on the windshield of a vehicle after the knots 68—68 of the cord 66 have been placed inside the vehicle (see FIG. 8) and the respective front door windows of the vehicle are rolled up such that (with the knots 68—68 on the inside of the vehicle) the cord 66 is lodged at points 70—70 between the edges of the windows and the inside edges of the front doors of the vehicle holding the front door windows. Thus, to facilitate the installation, the two front doors are opened and the front door windows are rolled down. The knots 68—68 are passed through the opened windows to be disposed in proximity to the inside surface of the front doors; and the front door windows are rolled up to lodge at points 70—70 the cord 66 between the edges of the front door window and the edges of the front doors holding the front door windows. The cord 66 is now lying rather loosely or in a nontaut posture across the hood of the vehicle or the rectangular piece of material 12, the two trapezoidal elements 24—24, and the optional ears 42—42. When the two front doors are closed, the cord 66 becomes taut across the face of the rectangular piece of material 12, the two trapezoidal elements 24—24, and the optional ears 42—42, as best illustrated in FIGS. 1 and 8.

The waterproof coating 38 of this invention may be any suitable waterproof coating including but not limited to Thompson® Waterseal, polyurethane, acrylic solution (water soluble), a waterproof coating sold under the trademark Michaelman ® 40-H, or any other waterproof coating that is capable of performing its function which is to prevent and protect the windshield cover 10 from moisture.

The waterpoof or water resistant coat 38 is applied in any suitable manner. By way of example only, a polyurethane waterproof coat 38 is initially applied with a brush, roller, or spray, on the material 12, the trapezoidal elements 24—24, and the optional ears 42—42. The coating is allowed to dry and age, for example from about 1 day to about one to two weeks. After aging, the windshield cover 10 is available for use.

By the practice of this invention there is provided an auto windshield anti-ice guard that will fit foreign and domestic cars. A clear windshield during freezing conditions not only increases driving visibility, but is a highly recommended safety precaution. The windshield cover 10 of this invention serves as an anti-ice guard, and even more importantly, a time saver for the user by the avoidance of ice scraping procedures on cold winter days and nights. More importantly further, the windshield cover 10 of this invention saves on fuel and gasoline since numerous times vehicle drivers have to allow the car to warm up in order that the defroster can melt the ice on the windshield.

The windshield cover 10 of this invention is convenient in that it folds down accordion style to fit easily into a plastic bag, thus keeping the interior of the car trunk dry. The drying process can be enhanced by leaving the plastic bag open. The windshield cover 10 is water resistant; therefore, the cover 10 will keep the windshield free of frost, ice, sleet, and snow. In one preferred embodiment of the invention, the windshield cover 10 comes equipped with the strap/anchor cord 48 which serves as a "rip-off" spoiler.

In order to keep the windshield cover 10 of this invention on the windshield, a stretch cord 66 is placed across the windshield cover 10 and held down via the two front doors of a vehicle. The stretch cord 66 has been fitted with two anchor stops 68—68 which has been more specifically referred to as knots 68—68. The stops or knots 68—68 are anchored at each side door window and are locked in the window run by rolling the window up to hold the cord 66 in place at points 70—70. When the stops or anchors 68—68 are in place, the car doors can be opened freely. If the vehicle or car design has side window ventilators, the stops/knots 68—68 of the stretch cord 66 may have to be anchored at the window ventilators, or between the door jamb in the car door.

The windshield cover 10 of this invention has been designed with safety in mind. It guards against obstruction of vision that has been caused by ice, sleet, and snow that accumulates on one's windshield. These elements have been a hazard and a time consumer since the introduction of the automobile.

The windshield cover 10 of this invention may also be employed as a sunshade in the summertime by placing the windshield cover 10 inside and on the auto's dashboard and subsequently turning the sun visors down to hold the windshield cover 10 of this invention in place. The windshield cover 10 would lodge between the underside of the auto's windshield and the dashboard in order to protect the inside of the car from the hot sun rays. Thus, the windshield cover 10 of this invention has been designed for dual usage as an auto sunshade and a safety device to guard against obstruction of vision by the freezing of ice and snow on one's auto windshield.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A windshield cover comprising in combination:
a generally rectangular piece of material having a top edge, a bottom edge, and two sides; and wherein the rectangular piece is foldable, in accordion style, along a plurality of fold lines, which extend from the top edge to the bottom edge of the rectangular piece of material to define a foldable rectangular piece of material having a plurality of planar rectangular elements jointed to each other along longitudinal edges thereof;
a pair of generally trapezoidal shaped elements having a top edge and a bottom edge and secured to the sides of the rectangular piece of material along an element fold line in an opposed relationship with respect to each other such that the rectangular piece of material is between the two trapezoidal shaped elements;
at least one strap means affixed to at least one of said pair of generally trapezoidal shaped elements;
a strap node means secured to an end of the strap means; and
a stretchable cord means having a cord knot means at each end, said stretchable cord means adapted to stretch across the rectangular piece of material to hold the same on a windshield of a vehicle after the cord knot means are placed inside the vehicle and a front door window of the vehicle is rolled up such that the cord means is lodged between an edge of the front door window and an inside edge of a front door of the vehicle holding the front door window.

2. The windshield cover of claim 1 additionally comprising a pair of support plates sandwiching the trapezoidal shaped elements; a bolt means passing through both pair of support plates and through said trapezoidal shaped element, said bolt means is formed with a bolt head and said strap means having an eye secured to its end opposed to the end of the strap means having the strap node means secured thereto, and said eye is secured around said bolt means and is flushed against one of the support plates.

3. The windshield cover of claim 2 additionally comprising a band means lapped over the top edge and the bottom edge of the generally rectangular piece of material to totally enclose the same.

4. The windshield cover of claim 3 additionally comprising a pair of ear elements secured to the trapezoidal shaped elements along an ear fold line in an opposed relationship with respect to each other such that the rectangular piece of material and the attached trapezoidal shaped elements are between the two ear elements, each of said ear elements having a side edge.

5. The windshield cover of claim 4 additionally comprising a waterproof coat surrounding said rectangular piece of material and said trapezoidal shaped elements and said ear elements.

6. The windshield cover of claim 5 wherein said band means is lapped over the top edge and bottom edge of the two trapezoidal shaped elements.

7. The windshield cover of claim 6 wherein said band means is also lapped over the side edge of each of the ear elements.

8. The windshield cover of claim 7 wherein each of said trapezoidal shaped elements and each of said ear elements and each of said rectangular elements comprises a corrugated body, a top surface disposed on one side of the corrugated body, and a bottom surface disposed on another side of the corrugated body.

* * * * *